(12) United States Patent
Schneider et al.

(10) Patent No.: US 12,152,692 B2
(45) Date of Patent: Nov. 26, 2024

(54) SYSTEM FOR MONITORING THE POSITION OF A VALVE NEEDLE OF AN EXPANSION VALVE

(71) Applicant: ECO Holding 1 GmbH, Marktheidenfeld (DE)

(72) Inventors: Toni Schneider, Esslingen (DE); Jens Moehring, Nürtingen (DE); Adrian Eslava Orradre, Stuttgart (DE)

(73) Assignee: ECO HOLDING 1 GMBH, Marktheidenfeld (DE)

(*) Notice: Subject to any disclaimer, the term of this patent is extended or adjusted under 35 U.S.C. 154(b) by 556 days.

(21) Appl. No.: 17/495,587

(22) Filed: Oct. 6, 2021

(65) Prior Publication Data
US 2022/0107033 A1    Apr. 7, 2022

(30) Foreign Application Priority Data
Oct. 7, 2020   (DE) ..................... 10 2020 126 256.6

(51) Int. Cl.
  *F25B 49/02*   (2006.01)
  *F16K 37/00*   (2006.01)
  *F25B 41/35*   (2021.01)

(52) U.S. Cl.
  CPC .......... *F16K 37/0033* (2013.01); *F25B 41/35* (2021.01); *F25B 49/02* (2013.01); *F25B 2600/2513* (2013.01)

(58) Field of Classification Search
  CPC ...... F16K 37/0033; F25B 41/35; F25B 49/02; F25B 2600/2513
  See application file for complete search history.

(56) References Cited

U.S. PATENT DOCUMENTS

2019/0178404 A1*   6/2019   Zhang ................. F16K 37/0041

FOREIGN PATENT DOCUMENTS

| AT | 511599 B1 | * | 12/2012 |
| CN | 211423395 U | * | 9/2020 |
| WO | WO-2019159698 A1 | * | 9/2019 |

OTHER PUBLICATIONS

Ning, An Electronic Expansion Valve, 2020, Full Document (Year: 2020).*

(Continued)

*Primary Examiner* — Nael N Babaa
(74) *Attorney, Agent, or Firm* — Lerner David LLP

(57) ABSTRACT

The invention relates to a system for monitoring the position of the valve needle of an expansion valve, having an expansion valve having a valve seat; a valve needle which is configured so as to be convertible axially between a first position in which the valve needle is received by the valve seat and closes the expansion valve, and a second position in which the valve needle is axially spaced apart from the valve seat and the expansion valve is at least partially opened; wherein the expansion valve has a magnet which is fixedly assigned to the valve needle such that the magnet is axially movable conjointly with the valve needle; and has a Hall sensor, wherein the Hall sensor is fixedly assigned to the valve seat and, by means of the flux density vector of the magnet, is configured for determining directly the absolute axial position of the valve needle. The invention moreover relates to a system for calculating the axial position of a valve needle in an expansion valve according to one of the embodiments described, wherein the system, by means of the Hall sensor, is configured for detecting a first component of the flux density vector of the magnet, by means of the Hall sensor is configured for detecting a second component of the (Continued)

flux density vector of the magnet, and for calculating therefrom the absolute axial position of the valve needle.

19 Claims, 2 Drawing Sheets

(56) References Cited

OTHER PUBLICATIONS

Muenzing, Valve Device, 2013, Full Document (Year: 2013).*
Hideo, Fluid control valve, 2019, Full Document (Year: 2019).*

* cited by examiner

SYSTEM FOR MONITORING THE POSITION OF A VALVE NEEDLE OF AN EXPANSION VALVE

The invention relates to a system for monitoring the position of the valve needle of an expansion valve an expansion valve having a valve seat; a valve needle which is configured so as to be convertible axially between a first position in which the valve needle is received by the valve seat and closes the expansion valve, and a second position in which the valve needle is axially spaced apart from the valve seat and the expansion valve is at least partially opened.

Expansion valves are devices which by locally constricting the flow cross section reduce the pressure of a fluid flowing therethrough and thus cause an expansion. In principle, expansion valves are used in a highly diverse manner. For example in cold-vapor compression refrigeration machines such as are used in refrigerators or air-conditioning installations, for example, the expansion valve reduces the pressure of the operating fluid which usually enters the expansion valve as an almost boiling liquid. The operating fluid here is imparted a change of state which in a first approximation can be considered to be adiabatic isenthalpic. In other words, neither is heat exchanged with the environment nor is the enthalpy of the fluid modified. Part of the fluid evaporates when passing through the expansion valve, while the other part remains in the liquid state. The operating fluid subsequently makes its way into the evaporator where the still liquid proportion absorbs heat from the environment and thus implements the actual benefit of the refrigeration machine.

Depending on the specific application it can be very important that the exact position of the valve needle must be established. For example, the potential flow capacity of an operating fluid can be determined by virtue of the exact position of the valve needle in relation to the valve seat of the expansion valve.

Various solutions for determining the position of the valve needle are known in the prior art.

In the known methods for determining the exact position of the valve needle, it is disadvantageous that the position is generally determined in an imprecise and error-prone manner. Moreover, it is disadvantageous that a reference run of the valve needle is necessary in order for the current position of said needle to be detected when starting up the expansion valve, for example after a power failure. Overall, this type of determining the position is complex and associated with system-related inaccuracies.

It is therefore an object of the invention to propose a system for monitoring the position of a valve needle of an expansion valve that at least partially overcomes the disadvantages of the prior art.

The object is achieved by a system for monitoring the position of the valve needle of an expansion valve, said system having an expansion valve having a valve seat; a valve needle which is configured so as to be convertible axially between a first position in which the valve needle is received by the valve seat and closes the expansion valve, and a second position in which the valve needle is axially spaced apart from the valve seat and the expansion valve is at least partially opened. The expansion valve moreover comprises a magnet which is fixedly assigned to the valve needle such that the magnet is axially movable conjointly with the valve needle. The system furthermore has a Hall sensor, wherein the Hall sensor is fixedly assigned to the valve seat and, by means of a flux density vector of the magnet, is configured for determining directly the absolute axial position of the valve needle.

Advantageous embodiments are set forth in the dependent claims and the coordinate claims.

As a result, the technical advantage that the position of the valve needle can be directly determined is achieved, for example. As a result of the direct determination of the flux density vector, a reference run when starting up the system is no longer required. The measurement is performed directly on the magnet and is subject to very high accuracy.

The influence of temperature variations, fields of radiation and manufacturing tolerances is minimized, this being of particular importance in particular in applications in the automotive sector. Higher-than-average requirements by virtue of the diverse stresses which arise when using an automobile exist specifically in the automotive sector.

According to one advantageous embodiment, the Hall sensor is configured for determining a first component of the flux density vector and a second component of the flux density vector of the magnet.

Proceeding from a system-internal coordinate system, that proportion of the flux density vector that can be assigned to a coordinate in the x-direction, y-direction or z-direction is understood to be a component of the flux density vector. Only two components are required in order for the axial position of the magnet and thus of the valve needle to be unequivocally determined. The third component thus does not have any tangible benefit for determining the axial position of the magnet. For example, the Hall sensor is thus configured for determining the x-component of the flux density vector, able to be determined in the system-internal coordinate system, and the y-component of the flux density vector, able to be determined in the system-internal coordinate system. The axial position can be determined directly from these two components by way of the resultant flux density vector.

According to one preferred embodiment, the Hall sensor is configured for determining a third component of the flux density vector of the magnet. As has already been discussed, the third component does not have any tangible benefit for determining the axial position of the magnet. Instead however, the third component can be used for checking the flawless assembly of the magnet in the system. Should deviations have arisen as a result of the assembly, said deviations can be calculated and, mathematically compensated for if necessary.

In order for the system to be produced in an ideally compact and reliably functioning manner, the expansion valve has a control unit, wherein the Hall sensor is disposed directly on the control unit.

According to one additional embodiment, the magnet is disposed on the valve needle by means of a magnet carrier. The technical advantage that the correlation between the magnet and the valve needle can be precisely predetermined and be simple to assemble is achieved as a result, for example. The magnet carrier must be able to follow the axial movement of the valve needle as precisely as possible.

According to one particular embodiment, the magnet carrier has an inner ring and an outer ring which are connected by means of a multiplicity of webs. The technical advantage that the magnet is able to be precisely positioned and the position of said magnet being readily detectable by the Hall sensor is achieved as a result, on the one hand. The outer ring here is particularly suitable for the disposal of the magnet because the magnet in the radial direction can be disposed as far outwards as possible as a result. This is necessary because the Hall sensor is assigned to the control unit and disposed outside a housing of the expansion valve. As a result of the magnet being disposed on the outer ring as far outwards as possible but within the housing, an almost interference-free and precise detection of the position can take place. On the other hand, the technical advantage that the inner ring ensures optimal guiding of the magnet carrier on the valve needle is ensured. The axial movement of the valve needle takes place by way of a rotation of a central spindle, wherein the rotating movement by way of a thread is converted to an upward and downward movement. The inner ring can ensure that the magnet carrier, and thus also the magnet, can directly follow the axial movement and is not compromised by the rotation of the spindle. The webs here establish a stable connection between the inner ring and the outer ring.

At least two webs, in particular three webs, are configured in order for the connection between the inner ring and the outer ring to be implemented in an ideally simple manner and without compromising the function of the expansion valve.

The inner ring is disposed directly on the valve needle in order for the detection of the position of the magnet to be implemented in an ideally precise manner. As a result, firstly the inner ring can be disposed as close as possible to the valve needle. This furthermore enables the magnet to be optimally correlated.

According to a particular preferred embodiment, the magnetic element is disposed on the outer ring. The outer ring is particularly suitable for disposing the magnet because the magnet within the housing of the expansion valve can be disposed so as to lie ideally radially far toward the outside. As a result of the Hall sensor being assigned to the control unit and being situated outside the housing of the expansion valve, the spacing between the Hall sensor and the magnet can be minimized. Very precise detecting of the position can be performed as a result.

In order for the position of the magnet to be detected it is moreover important that said magnet is disposed without any inaccuracies in relation to the valve needle. According to one further embodiment, the expansion valve has an elastic element which is configured for pressing the magnet carrier axially onto the valve needle. As a result, potential vibrations, shocks or else temperature-related influences can be compensated for directly because the elastic element ensures that the position of the magnet carrier relative to the valve needle does not vary. For example, the elastic element is configured as a spiral compression spring. The spiral compression spring ensures a uniform and direct axial correlation between the magnet carrier and the valve needle.

In one preferred embodiment the magnet is configured as an annular member. As a result, the technical advantage that the magnet as a rotationally symmetrical member is easier to assemble in the position thereof is achieved, for example. In other words, the probability of measuring inaccuracies is additionally reduced in the case of a magnet being an annular member.

The object is additionally achieved by a system according to one of the preceding embodiments, wherein the system furthermore has a hollow shaft and a central spindle which is disposed within the hollow shaft. A rotating movement of the central spindle by way of a threaded connection to the hollow shaft is convertible to an axial movement which for opening and closing the expansion valve is transmittable to the valve needle. The hollow shaft here has a multiplicity of slots, the webs of the magnet carrier extending through said slots.

The advantages are comparable to those advantages which are derived from the preceding embodiments. The position of the valve needle can thus be directly determined, and as a result of the direct determination of the flux density vector no reference run is required when starting up the system. The measurement is performed directly on the magnet and is subject to high accuracy. Accuracy-reducing influences such as temperature variations, fields of radiation and manufacturing tolerances are minimized, this being of particular importance in particular in applications in the automotive sector. The slots which the hollow shaft comprises are adapted exactly to the webs of the magnet carrier that connect the inner ring to the outer ring.

In order for measuring inaccuracies as a result of potential vibrations, shocks or other influences to be minimized, the elastic element is disposed between the hollow shaft and the magnet carrier. The elastic element is configured as a spiral compression spring, for example, which ensures that the position of the magnet carrier relative to the valve needle does not vary in the axial direction.

According to an additional aspect, the object is achieved by a system for calculating the axial position of a valve needle in an expansion valve according to one of the preceding embodiments, wherein the system, by means of the Hall sensor, is configured for detecting a first component of the magnetic field vector of the magnet, by means of the Hall sensor is configured for detecting a second component of the magnetic field vector of the magnet, and for calculating therefrom the absolute axial position of the magnet.

The advantage that the position of the valve needle can be directly determined is also achieved according to this aspect of the invention. The direct determination of the flux density vector renders superfluous a reference run when starting up the system. The measurement is performed directly on the magnet and is subject to high accuracy, wherein influences of temperature variations, fields of radiation and manufacturing tolerances are minimized.

Further advantages of the invention are derived from the description and the drawings. The invention is explained in more detail hereunder by virtue of the exemplary embodiments illustrated in the drawings in which.

Figure 1:
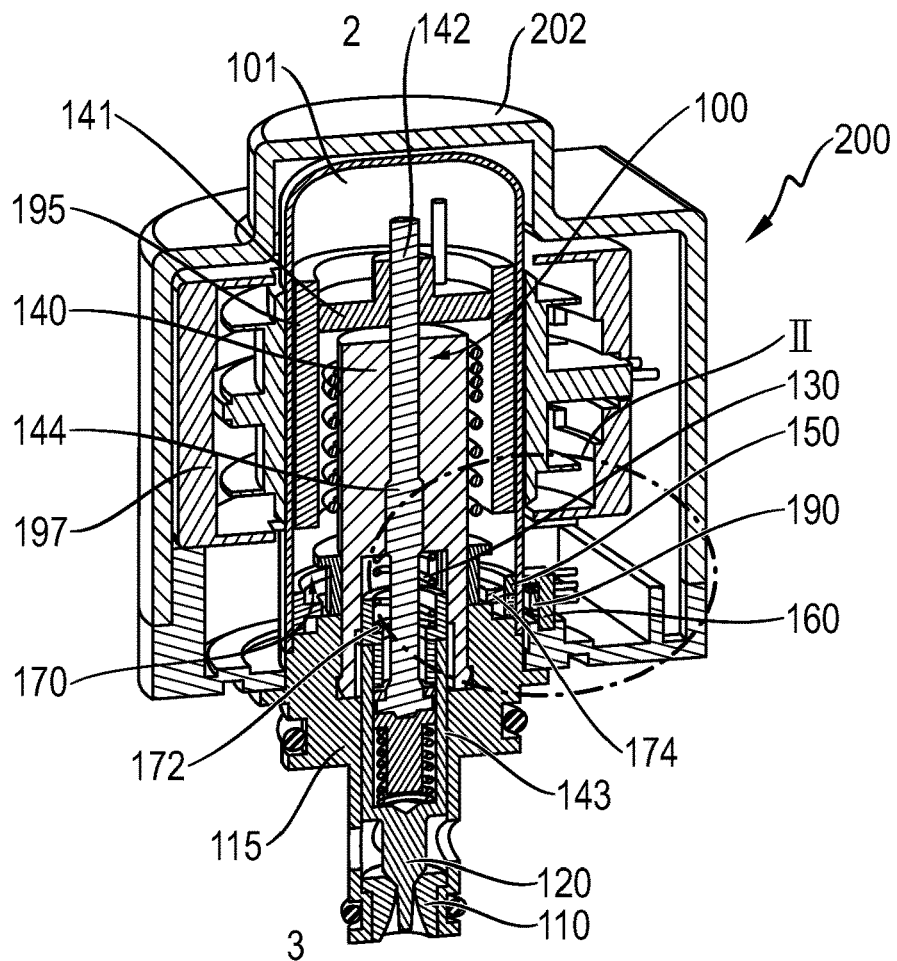
FIG. 1 shows a first embodiment of a system according to the invention for monitoring the position of the valve needle of an expansion valve in a longitudinal sectional view.

FIG. 1 shows a first embodiment of a system 200 according to the invention for monitoring the position of the valve needle 120 of an expansion valve 100, in a longitudinal sectional view.

For the purpose of description, a top side 2 and a bottom side 3 are defined in FIG. 1. The top side 2 and the bottom side 3 are in each case also used for describing individual components of which the overall arrangement can be seen in FIG. 1. The expansion valve 100 has a valve main body 115 and a housing 101.

The valve main body 115 is illustrated as an integrally configured body and can be introduced into a valve installation space (not shown) in the manner of a cartridge. Accordingly, the entire expansion valve 100 can be easily installed in the valve installation space and uninstalled from the latter.

The housing 101 which is configured in the shape of a sleeve is disposed on an upper side (that is to say toward the top side 2) of the valve main body 115. The valve main body 115 closes off the housing 101 on the bottom side 3. The housing 101 is radially surrounded by a stepper motor or a stator 197, respectively. A rotor 195 which is assigned to the stator 197 and which transmits the rotation thereof to a central spindle 142 is disposed within the housing 101.

The rotation from the rotor 195 is transmitted to the central spindle 142 by way of an adapter element 141. The central spindle 142 has an external thread which is connected to an internal thread of a hollow shaft 140. As a result of the threaded connection, the central spindle 142 along the rotation axis moves axially downward (that is to say from the top side 2 to the bottom side 3), or upward (that is to say from the bottom side 3 to the top side 2). Consequently, the rotating movement of the rotor 195 can be converted into an axial movement by this moving mechanism.

The lower end of the central spindle 142 (that is to say toward the bottom side 3) is received in a sleeve element 143. The sleeve element 143 per se is received in the valve main body 115. Furthermore, a lower region of the hollow shaft 140 is also received in the valve main body 115.

The sleeve element 143 on a lower region has the valve needle 120. The sleeve element 143 is an integral element, that is to say that the valve needle 120 overall is configured in the manner of a sleeve. The valve needle 120 sits in a valve seat 110, wherein an opening is exposed and a fluid can flow therethrough by lifting said valve needle 120 (upward, that is to say toward the top side 2) from the valve seat 110.

The valve seat 110 is fixedly assigned to the valve main body 115. The valve needle 120 is configured so as to be convertible axially between a first position in which the valve needle 120 is received by the valve seat and closes the expansion valve 100, and a second position in which the valve needle 120 is axially spaced apart from the valve seat 110 and the expansion valve 100 is at least partially opened.

In FIG. 1 the valve needle 120 is illustrated in the first position, that is to say in the state in which said valve needle 120 is placed on the valve seat 110 and presses on the latter in a sealing manner.

Elements which serve for transmitting force and delimiting torque between the central spindle 142 and the sleeve element 143 are disposed within the sleeve element 143.

The expansion valve 100 described is now disposed in a system housing 202. The system housing 202 comprises the expansion valve 100, the stator 197 which in the radial direction is disposed on the housing 101 of the expansion valve, and a control unit 160 of the system 200, said control unit 160 supporting the Hall sensor 190 and being disposed outside the housing 101 but within the system housing 202. The control unit 160 can be configured as a circuit board. Alternatively, said control unit 160 can also be configured as a central control unit for the entire system.

The system 200 furthermore has a magnet 150 which is fixedly assigned to the valve needle 120. In other words, the magnet 150 is axially movable conjointly with the valve needle 120. An axial movement of the magnet 150 is thus identical to the movement of the valve needle 120. A Hall sensor 190 is disposed outside the housing 101 of the expansion valve 100. The Hall sensor 190 is fixedly assigned to the valve seat 110 and, by means of a flux density vector of the magnet 150, is configured for directly determining the absolute axial position of the valve needle 120.

As a result of the direct determination of the position of the valve needle 120, a reference run is no longer required when starting up the system 200. The measurement is performed directly on the magnet 150 and is subject to high accuracy.

The Hall sensor 190 is disposed directly on the control unit 160 in order for the system 200 to be produced in an ideally compact and reliable manner. The control unit 160 in the radial direction is disposed directly outside the magnet 150 so as to implement an ideally precise detection of the position.

To this end, the magnet 150 is fastened to the valve needle 120 by means of a magnet carrier 170. The magnet carrier 170 has an inner ring 172 and an outer ring 174 which are connected to one another by means of a multiplicity of webs 176.

The magnet carrier 170 here ensures a precise correlation between the magnet 150 and the valve needle 120 which is easy to establish. The magnet carrier 170 here must be able to follow the axial movement of the valve needle in an ideally accurate manner.

The magnet 150 is disposed directly on the outer ring 174. The magnet 150 in FIG. 1 is configured as an annular magnet, this simplifying the assembly as well as the detecting of the position. Alternatively however, the magnet 150 can be configured in any other shape. In the case of the annular design embodiment of the magnet 150 it is additionally advantageous that the magnet 150 in the radial direction can be disposed ideally far toward the outside. This is necessary because the Hall sensor 190 is assigned to the control unit 160 and is disposed outside a housing 101 of the expansion valve 100.

The inner ring 172 bears on the central spindle 142 and is additionally guided on the inner diameter of the hollow shaft 140. Optimal guiding of the magnet carrier 170 on the valve needle 120 is thus ensured. As has already been described, the axial movement of the valve needle 120 takes place by way of a rotation of the central spindle 142, wherein the rotating movement by way of a thread is converted into an upward and downward movement. The inner ring 172 can ensure that the magnet carrier 170, and thus also the magnet 150, can directly follow the axial movement and is not compromised by the rotation of the central spindle 142.

An elastic element 130 in the form of a compression spring is configured for pressing the magnet carrier 170 axially onto the valve needle 120. To this end, the compression spring is disposed between the hollow shaft 140 and the sleeve element 143, as a result of which potential vibrations, shocks or else temperature-related influences are directly compensated for. The compression spring thus ensures that the axial position of the magnet carrier 170 relative to the valve needle 120 does not vary, wherein a rotation of the valve needle 120 relative to the magnet carrier 170 is possible.

The inner ring 172 and the outer ring 174 are connected to one another by way of webs (not shown), wherein the hollow shaft 140 possesses slots (not shown), the webs 176 of the magnet carrier 170 extending in the radial direction through said slots and thus ensuring a fixed connection.

Figure 2:
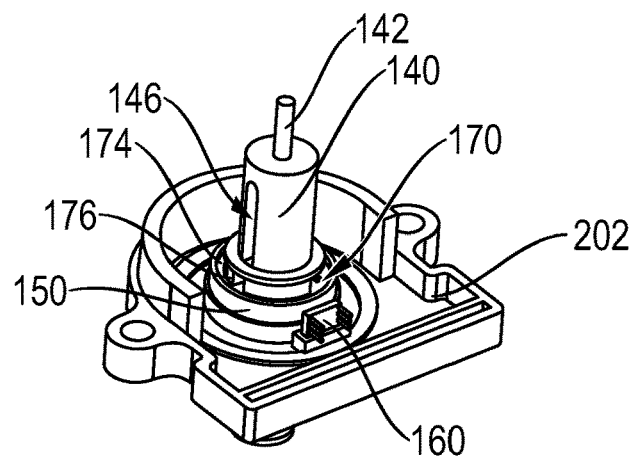
FIG. 2 shows a partial aspect of the system for monitoring the position of the valve needle of an expansion valve from FIG. 1.

FIG. 2 shows a partial aspect of the system 200 for monitoring the position of the valve needle 120 of an expansion valve 100 from FIG. 1. FIG. 2 shows a lower portion of the system housing 202. The lower portion of the system housing 202 supports the control unit 160 which comprises the Hall sensor 190. The hollow shaft 140 and the central spindle 142 are disposed so as to lie inside. One of the slots 146 for passing through the webs 176 extends laterally on the hollow shaft 140, said webs 176 connecting the inner ring 172 and the outer ring 174 to one another. The outer ring 174 supports the magnet 150 of annular configuration which, for the precise detection of the position, is assigned directly to the Hall sensor (not shown) and thus to the control unit 160.

Figure 3:
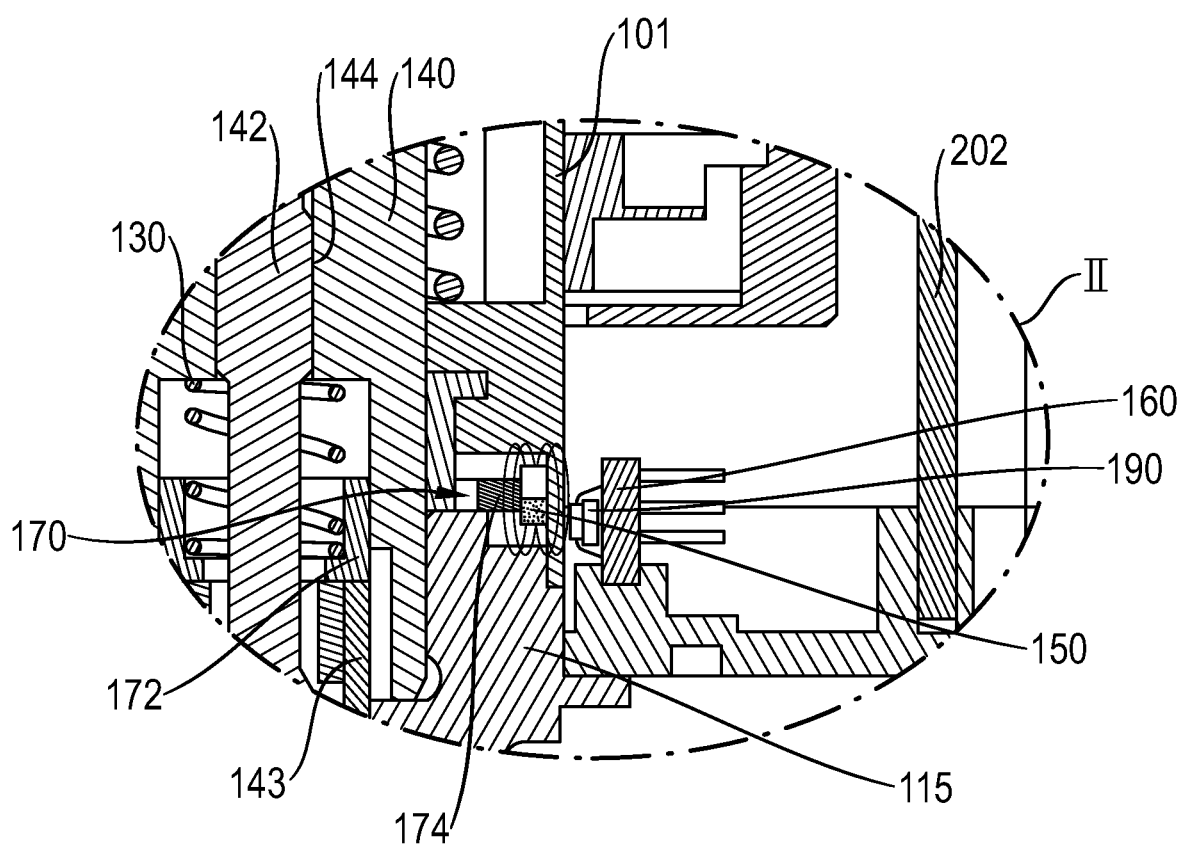
FIG. 3 shows an enlarged partial view II of the system for monitoring the position of the valve needle of an expansion valve from FIG. 1.

FIG. 3 shows an enlarged partial view II of the system 200 for monitoring the position of the valve needle 120 of an expansion valve 100 from FIG. 1.

The enlarged partial view II shows the hollow shaft 140 and the central spindle 142 which is disposed within the hollow shaft 140. Additionally shown is the sleeve element 143 which is integrally connected to the valve needle (not shown).

The inner ring 172 which by way of the elastic element 130 in the form of a compression spring is pressed in the direction of the sleeve element 143 is situated within the hollow shaft 140 and above the sleeve element 143. As a result, the inner ring 172 and the entire magnet carrier 170 are pressed axially onto the valve needle 120, and potential vibrations, shocks or else temperature-related influences are directly compensated for.

The outer ring 174 is fixedly connected to the inner ring 172 by way of the webs (not shown) of the magnet carrier 170. The outer ring 174 supports the magnet 150 in the form of an annular magnet. As a result of the fixed connection between the inner ring 172 and the outer ring 174, a position of the magnet 150 established by the Hall sensor 190, by way of the outer ring 174, the webs and the inner ring 172, can thus be directly attributed to the sleeve element 143 and thus to the valve needle 120.

The system 200 having the Hall sensor 190 in conjunction with the control unit 160 is configured for detecting a first component and a second component of the flux density vector of the magnet 150, so as to therefrom calculate the absolute axial position of the magnet 150 and thus of the valve needle.

Only two components are required in order for the axial position of the magnet 150 and thus of the valve needle 120 to be unequivocally determined. The Hall sensor 190 is thus configured for determining the x-component of the flux density vector, determinable in the system-internal coordinate system, and the y-component of the flux density vector, determinable in the system-internal coordinate system, of the magnet 150. The axial position of the magnet 150 and thus of the valve needle 120 can be directly determined from these components by way of the resultant flux density vector.

All features explained and shown in conjunction with the individual embodiments of the invention can be provided in various combinations in the subject matter according to the invention so as to simultaneously implement the advantageous effects of said features. The scope of protection of the present invention is defined by the claims and is not restricted by the features explained in the description or shown in the figures.

LIST OF REFERENCE SIGNS

2 Top side
3 Bottom side
100 Expansion valve
101 Housing
110 Valve seat
115 Valve main body
120 Valve needle
130 Elastic element
140 Hollow shaft
141 Adapter element
142 Central spindle
143 Sleeve element
144 Threaded connection
146 Slots
150 Magnet
160 Control unit
170 Magnet carrier
172 Inner ring
174 Outer ring
176 Webs
190 Hall sensor
195 Rotor
197 Stator
200 System
202 System housing

The invention claimed is:

1. A system for monitoring the position of the valve needle of an expansion valve, said system comprising:
an expansion valve having a valve seat;
a valve needle which is configured so as to be convertible axially between a first position in which the valve needle is received by the valve seat and closes the expansion valve, and a second position in which the valve needle is axially spaced apart from the valve seat and the expansion valve is at least partially opened;
wherein the expansion valve
has a magnet which is fixedly assigned to the valve needle such that the magnet is axially movable conjointly with the valve needle; and
has a Hall sensor, wherein the Hall sensor is fixedly assigned to the valve seat and, by means of a flux density vector of the magnet, is configured for determining directly the absolute axial position of the valve needle,
wherein the Hall sensor is configured for determining a first component of the flux density vector and a second component of the flux density vector of the magnet.

2. The system according to claim 1, wherein the Hall sensor is further configured for determining a third component of the flux density vector of the magnet.

3. The system according to claim 1, wherein the expansion valve has a control unit and wherein the Hall sensor is disposed directly on the control unit.

4. The system according to claim 1,
wherein the magnet is disposed on the valve needle by a magnet carrier.

5. The system according to claim 4,
wherein the magnet carrier has an inner ring and an outer ring which are connected by a multiplicity of webs.

6. The system according to claim 5,
wherein the multiplicity of webs comprises at least two webs.

7. The system according to claim 5,
wherein the inner ring is disposed directly on the valve needle.

8. The system according to claim 5, wherein the magnet is disposed on the outer ring.

9. The system according to claim 5,
wherein the expansion valve has an elastic element which is configured for pressing the magnet carrier axially onto the valve needle.

10. The system according to claim 1, wherein the magnet is configured as an annular member.

11. The system according to claim 9, further comprising:
a hollow shaft;
a central spindle which is disposed within the hollow shaft, wherein a rotating movement of the central spindle by way of a threaded connection to the hollow shaft is convertible to an axial movement which for opening and closing the expansion valve is transmittable to the valve needle; and wherein the hollow shaft has a multiplicity of slots, the multiplicity of webs of the magnet carrier extending through said slots.

12. The system according to claim 11,
wherein the elastic element is disposed between the hollow shaft and the magnetic carrier.

13. The system for calculating the axial position of a valve needle in an expansion valve according to claim 1, wherein
the system, by the Hall sensor, is configured for detecting a first component of the flux density vector of the magnet,
by the Hall sensor is configured for detecting a second component of the flux density vector of the magnet, and
for calculating therefrom the absolute axial position of the valve needle.

14. The system according to claim 1,
wherein the expansion valve has a control unit and wherein the Hall sensor is disposed directly on the control unit.

15. The system according to claim 2,
wherein the expansion valve has a control unit and wherein the Hall sensor is disposed directly on the control unit.

16. The system according to claim 1,
wherein the magnet is disposed on the valve needle by means of a magnet carrier.

17. The system according to claim 2,
wherein the magnet is disposed on the valve needle by a magnet carrier.

18. The system according to claim 3,
wherein the magnet is disposed on the valve needle by a magnet carrier.

19. The system according to claim 6,
wherein the inner ring is disposed directly on the valve needle.

* * * * *